United States Patent
Luschi et al.

(10) Patent No.: US 6,539,067 B1
(45) Date of Patent: Mar. 25, 2003

(54) CHANNEL ESTIMATION USING SOFT-DECISION FEEDBACK

(75) Inventors: Carlo Luschi, Oxford (GB); Syed Aon Mujtaba, Berkeley Heights, NJ (US); Magnus Sandell, Swindon (GB); Paul Edward Strauch, Swindon (GB); Ran-Hong Yan, Longcot (GB); Stephan ten Brink, Allmersbach im Tal (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/300,495

(22) Filed: Apr. 28, 1999

(30) Foreign Application Priority Data

Apr. 30, 1998 (EP) .............................. 98303417

(51) Int. Cl.⁷ .............................................. H04L 27/06
(52) U.S. Cl. ....................... 375/340; 375/231; 375/232; 375/348
(58) Field of Search ................................ 375/340, 232, 375/233, 341, 229, 230, 231, 346, 348

(56) References Cited

U.S. PATENT DOCUMENTS 5,432,816 A * 7/1995 Gozzo .......................... 375/232
5,822,380 A * 10/1998 Bottomley ................... 375/347
6,185,251 B1 * 2/2001 Fertner ........................ 375/231

FOREIGN PATENT DOCUMENTS

WO      WO 98/01959      7/1997      ............ H04B/7/02

OTHER PUBLICATIONS

Vallet, R. "Symbol By Symbol Map Detection And The Baum–Welch Identification Algorithm In Digital Communications" "Signal Processing Theories And Applications, Brussels, Aug. 24–27, 1992 vol. 3 Conf. 6" pp. 131–134.

Castellini, G. et al "A Continuosly Adaptive MLSE Receiver For Mobile Communications: Algorithm And Performance" "IEEE Transactions On Communications, vol. 45 No. 1, Jan. 1997" pp. 80–88.

(List continued on next page.)

Primary Examiner—Stephen Chin
Assistant Examiner—David B. Lugo

(57) ABSTRACT

A method of estimating channel impulse response in a signal transmitted over a channel in a communication system is described. The channel estimator obtains a priori knowledge about the transmitted signal, and then uses the transmitted signal and the a priori knowledge to choose an estimate of channel impulse response which minimizes the expected distance between the transmitted signal and a reconstructed signal. The expected distance that is minimized is a cost function, represented by $E\{\|r-Bh\|^2 r\}$. By using soft decision feedback, the invention minimizes erroneous decision feedback which can cause error propagation. The decisions are usually in the form of log likelihood ratios (LLR).

4 Claims, 1 Drawing Sheet

OTHER PUBLICATIONS

Perreau, S. et al "An Equalizer Including A Soft Channel Decoder" "IEEE Signal Processing Workshop On Signal Processing Advances In Wireless Communications, Apr. 16, 1997" pp. 9–12.

Clark, A.P. et al "Data Transmission At 19.2 kbit/s Over Telephone Circuits" "Radio And Electronic Engineer, vol. 53, No. 4 Apr. 1983" pp. 157–166.

Morgul, A. et al "Decision Directed Channel Parameter Estimation And Tracking Using Erroneous Detectors" "Signal Processing European Journal Devoted To The Methods And Applications Of Signal Processing, vol. 25 No. 3, Dec. 1, 1991" pp. 307–318.

Wu, L. et al "A New Short–Block Digital Transmission Scheme With Adaptive MLSE For Mobile Radio Channels" "Proceedings Of The Vehicular Technology Conference, Stockholm vol. 1 Conf. 44 Jun. 8, 1994" pp. 243–247.

Turin, G.L. "Introduction To Spread–Spectrum Antimultipath Techniques And Their Application To Urban Digital Radio" "Proceedings Of The IEEE vol. 68, No. 3 Mar. 1980" pp. 328–353.

Hagenauer, J. "Source–Controlled Channel Decoding" "IEEE Transactions On Communications vol. 43, No. 9 Sep. 1995" pp. 2449–2457.

Forney, Jr., G.D. "Maximum–Likelihood Sequence Estimation Of Digital Sequences In The Presence Of Intersymbol Interference" "IEEE Transactions On Infotmation Theory, vol. IT–18 May 1972" pp. 363–378.

Chang, K.H. et al "Iterative Joint Sequence And Channel Estimation For Fast Time–Varying Intersymbol Interference Channels" "Proc. Intern. Conf. Commun. Jun. 1995" pp. 357–361.

European Search Report, Dated Oct. 12, 1998.

* cited by examiner

CHANNEL ESTIMATION USING SOFT-DECISION FEEDBACK

CROSS-REFERENCE TO RELATED APPLICATION

This application claims priority of European Patent Application No. 98303417.4, which was filed on Apr. 30, 1998.

FIELD OF THE INVENTION

This invention relates to channel estimation methods and apparatus in mobile radio communications, which adaptively compensate for channel distortion on a block-by-block basis.

ART BACKGROUND

In digital mobile radio communications, transmission channels suffer from severe distortion due to frequency selective fading. In addition, channel characteristics are normally time-varying due to the relative motion of fixed and mobile stations. Inter-symbol interference (ISI) is one of the primary impediments to reliable estimates of the transmitted data. In order to allow for reliable transmission, the receiver must be able to estimate and compensate for channel distortion on a block-by-block basis. Equalization schemes usually employed in modern mobile communications rely on an estimate of the channel, generated from a known training sequence, inserted into the transmitted signal block. Equalization may be improved by means of decision feedback, as described in K. H. Chang and C. N. Georghiades in "Iterative Join Sequence and Channel Estimation for Fast Time-Varying Inter-symbol Interference", Proc. Intern. Conf. Commun. Pp.357–361, June 1995.

There is thus a need for an equalizer with improved performance and which reduces the effects of error propagation.

SUMMARY OF THE INVENTION

According to a first aspect of the invention there is provided a method of estimating channel impulse response in a signal transmitted over a channel in a communication system characterized by obtaining a priori knowledge about the transmitted signal and using the transmitted signal and the said a priori knowledge to choose an estimate of channel impulse response which minimizes the expected distance between the transmitted signal and a reconstructed signal.

In hard decision feedback, the decisions are assumed to be correct, and they are used in addition to a training sequence. Unfortunately, erroneous decisions may cause error propagations. With soft decision feedback, on the other hand, the decisions are usually in the form of log likelihood ratios (LLR).

A detailed description of the invention, using by way of illustration a practical digital radio receiver, is described below with reference to the following figures in which:

DETAILED DESCRIPTION

Figure 1:
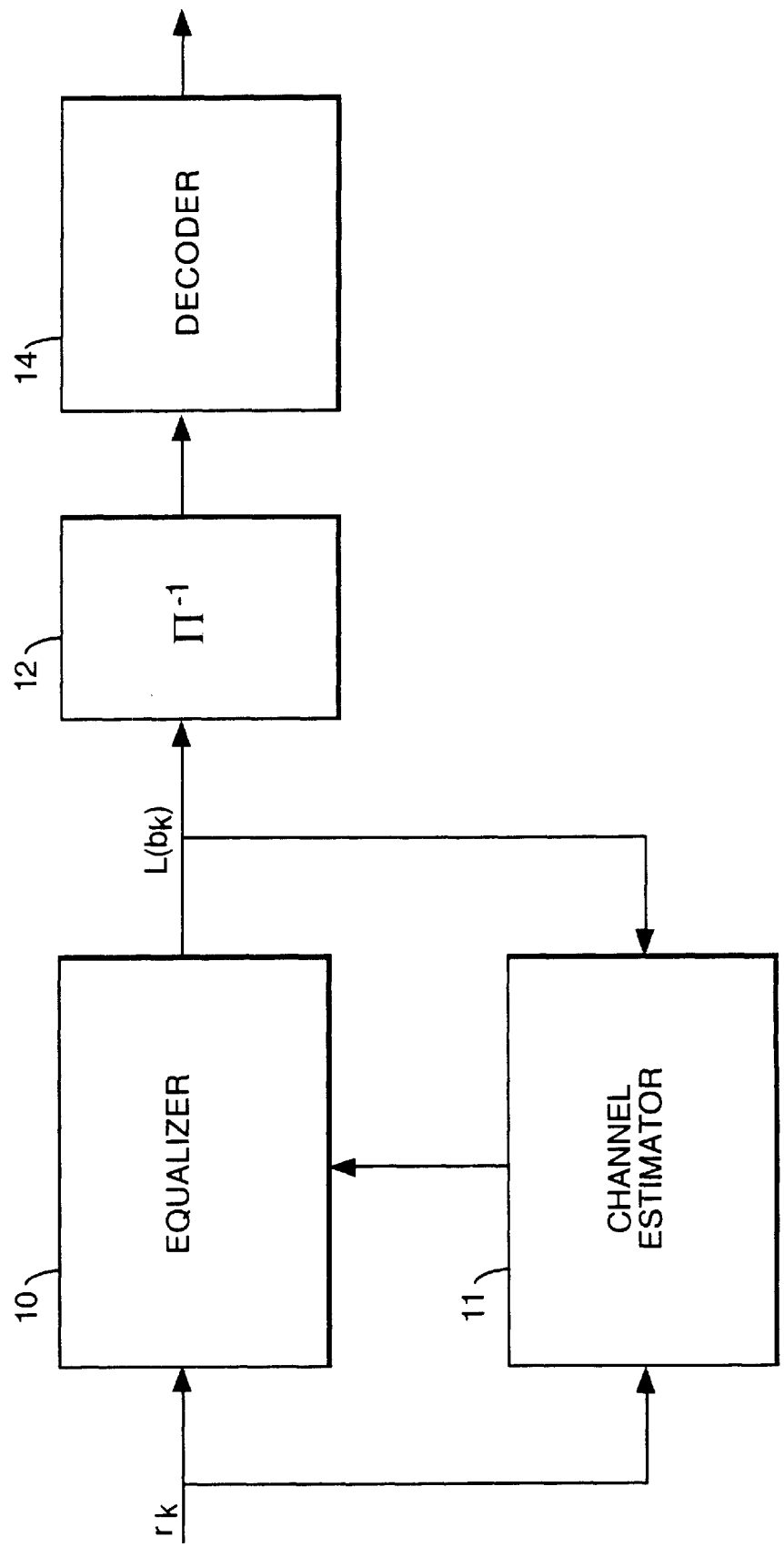
FIG. 1 shows in outline an equalizer for a digital radio receiver.

The discrete-time received signal $r_k$ of FIG. 1 can be written as $$r_k = \sum_{l=0}^{L-1} b_{k-l} h_l + n_k \quad (1)$$

where $b_k \in \{-1, 1\}$ are the transmitted data symbols or known training sequence symbols, the L complex tap-gains $h_l$ represent the samples of the equivalent channel impulse response, and $n_k$ indicates additive white Gaussian noise with zero mean and variance $\sigma^2$. Channel equalization is commonly performed by maximum likelihood (ML) or maximum a posteriori probability (MAP) data estimation. In both cases, the receiver must first estimate, in the channel estimator 11, the channel impulse response $h_l$, which is required in the data estimation process, carried out in the equalizer 10. The data output $L(b_k)$ is then deinterleaved, as indicated by $\Pi^{-1}$ (12) in FIG. 1 and decoded (14). The initial channel estimation is usually obtained by means of correlative channel sounding. In this case, the samples of the CIR estimate are obtained by correlating the received signal $r_k$ with N=16 bits $b_k$ out of the 26 bits training sequence:

$$\hat{h}_l = \frac{1}{N} \sum_{i=0}^{N-1} b_i r_{l+i} + n_k, l = 0, \ldots, L-1 \quad (2)$$

Due to the good autocorrelation properties of the GSM training sequence, the correlative channel sounding technique corresponds to ML channel estimation.

Once the channel estimate is available, the estimation of the data symbol sequence is performed. If the channel cannot be considered approximately constant within one burst, the initial channel estimate can be updated during the burst by using the decisions at the equalizer output. The equalizer soft-output sequence is finally deinterleaved and decoded.

Maximum likelihood sequence estimation implemented by the Viterbi algorithm (VA) is the optimum sequence detector, such as described in G. D. Forney, Jnr., "Maximum Likelihood Sequence Estimation of Digital Sequences in the presence of Intersymbol Interference", *IEEE Trans. Inform. Theory, vol. IT*-18, pp. 363–378, May 1972. It is widely used in digital mobile receivers for processing both the ISI trellis (equalization) and the channel code trellis (channel decoding). However, the channel decoder performance is improved by an equalizer which provides soft values at the decoder input. Furthermore, in some advanced schemes implementing iterative equalization and decoding and/or source controlled channel decoding, such as described in J. Hagenauer, "Source Controlled Channel Decoding", *IEEE Trans. On Commun, vol* 43, no 9, pp. 2449–2457 September 1995, the channel decoder must be able to provide soft-outputs for the coded bits and for the information bits.

In terms of bit-error probability, the optimum algorithm for soft-in/soft-out equalization and decoding is the symbol-by-symbol MAP algorithm. In fact, being an a posteriori probability (APP) calculator, it intrinsically provides soft output values.

In a hard decision (HD) feedback scheme, all decisions are assumed to be correct and may be used as an additional training sequence. By using vector notation, the received signal may be described as $$\underbrace{\begin{pmatrix} r_{L-1} \\ \vdots \\ r_{N-1} \end{pmatrix}}_{r} = \underbrace{\begin{pmatrix} b_{L-1} & b_{L-2} & \cdots & b_0 \\ b_L & b_{L-1} & \cdots & b_1 \\ \vdots & \vdots & \ddots & \vdots \\ b_{N-1} & b_{N-2} & \cdots & b_{N-L} \end{pmatrix}}_{B} \underbrace{\begin{pmatrix} h_0 \\ \vdots \\ h_{L-1} \end{pmatrix}}_{h} + \underbrace{\begin{pmatrix} n_{L-1} \\ \vdots \\ n_{N-1} \end{pmatrix}}_{n}$$

where r is the received signal vector, B is the matrix with the transmitted bits, h denotes the channel vector, and n the channel noise. Since we assume binary signaling, the transmitted bits $b_k$, take on the values ±1. The matrix product Bh corresponds to the convolution between $b_k$ and $h_k$ (see equation (1)). Note that the above notation assumes the channel to be constant over the block of transmitted data.

The least square (LS) estimate of the channel is $$\hat{h}^{HDLS} = (B^H B)^{-1} B^H r$$

where H denotes Hermitian transpose and the inverse is assumed to exist.

With soft decision (SD) feedback, the soft output of the equalizer is fed back to the channel estimator. The soft output is usually in the form of a log-likelihood ratio (LLR)

$$L(b_k \mid r) = \log \frac{\Pr(b_k = +1 \mid r)}{\Pr(b_k = -1 \mid r)} \quad (3)$$

which may equivalently be written as a probability $$\Pr(b_k \mid r) = \frac{e^{\frac{1}{2}L(b_k \mid r)}}{e^{\frac{1}{2}L(b_k \mid r)} + e^{-\frac{1}{2}L(b_k \mid r)}}$$

This a posteriori probability from the equalizer can be used as a priori knowledge for the channel estimator. A possible, but by no means unique, cost function to minimize would be $$E\{\|r - Bh\|^2 \mid r\} = E\left\{ \sum_{k=L-1}^{N-1} |r_k - h_k * b_k|^2 \mid r \right\} \quad (4)$$

where the expectation is taken over the bits $b_k$ conditioned on the received sequence r. This cost function represents the average (or expected) distance between the received signal and a reconstructed signal. To minimize the cost function (4) it is differentiated with respect to the channel $$\frac{\delta}{\delta h} E\{\|r - Bh\|^2 \mid r\} = E\left\{ \frac{\delta}{\delta h}(r - Bh)^H(r - Bh) \mid r \right\} = 0 \Rightarrow$$

$$E\{-B^H r + B^H Bh \mid r\} = 0 \Rightarrow h = (\overline{B^H B})^{-1} \overline{B}^H r$$

where $\overline{B^H B} = E\{B^H B\}$ and $\overline{B} = E\{B\}$. For soft decision $$E\{b_k b_l \mid r\} = \begin{cases} \overline{b}_k \overline{b}_l & k \neq l \\ 1 & k = l \end{cases}$$

where $\overline{b}_k = E\{b_k r\} = 2\Pr(b_k + 1 \mid r) - 1$. Note that this value is always in the range [−1,+1]. The expectation of $B^H B$ (see above) now becomes:

$$\overline{B^H B} = \begin{pmatrix} N-L+1 & \overline{b}_{L-1}\overline{b}_L + \cdots + \overline{b}_{N-2}\overline{b}_{N-1} & \cdots & \overline{b}_0\overline{b}_L + \cdots + \overline{b}_{N-L-2}\overline{b}_{N-1} \\ \overline{b}_{L-1}\overline{b}_L + \cdots + \overline{b}_{N-2}\overline{b}_{N-1} & N-L+1 & \cdots & \overline{b}_0\overline{b}_{L-1} + \cdots + \overline{b}_{N-L-2}\overline{b}_{N-2} \\ \vdots & \vdots & \ddots & \vdots \\ \overline{b}_0\overline{b}_L + \cdots + \overline{b}_{N-L-1}\overline{b}_{N-1} & \overline{b}_0\overline{b}_{L-1} + \cdots + \overline{b}_{N-L-1}\overline{b}_{N-2} & \cdots & N-L+1 \end{pmatrix}$$

The off-diagonals of $\overline{B^H B}$ are small compared to the main diagonal terms. By ignoring them we have the simplification $$\overline{B^H B} \approx (N-L+1)I \quad (5)$$

and the simplified estimator (channel sounding) becomes $$\hat{h}^{HDCS} = \frac{1}{N-L+1} \overline{B}^H r \quad (6)$$

$$\hat{h}_m^{HDCS} = \frac{1}{N-L+1} \sum_{k=L-1}^{N-1} r_k \overline{b}_{k-m}$$

$$\overline{b}_{k-m} = E\{b_k\} = 2\Pr(b_k = +1 \mid r) - 1 = \tanh\left(\frac{L(b_k \mid r)}{2}\right)$$

Although the equalizer provides the log-likelihood ratios $L(b_k|r)$, these can easily be transformed by a lookup table to produce $\overline{b}_k$.

The above analysis also applies to the case where the channel estimator is obtained by feeding back the L-values of the coded bits provided by the channel decoder.

At low SNR, the invention performs significantly better than hard decisions. From (6), where bits $b_k$ are uncertain (say, $\Pr(b_k=+1|r)=0.6$) will produce a soft value (in this case $\overline{b}_k=0.2$), whereas bits with a high reliability will give soft values close to ±1. This means that when a decision error occurs at the equalizer output, the probabilities $\Pr(b_k=+1|r)$ often indicates a weak reliability which the channel estimator can use to reduce the effects of error propagation.

At higher SNR, simulation show that least squares estimators perform significantly better than channel sounding, since least squares estimators can use the soft information to optimally weigh the feedback bits. At higher SNR, approximations (2) and (5) become significant, whereas with a low SNR this approximation error is concealed by the channel noise.

Simulations have also shown that the invention provides an improvement of about 0.8 dB with channel sounding and about 0.9 dB with a least squares estimation. Another advantage of the invention is that it does not require any matrix inversion.

What is claimed is:

1. A method of estimating channel impulse response in a signal b transmitted over a channel in a communication system and received as a signal r, said method comprising the steps of:

obtaining a priori knowledge about the transmitted signal b;

using the transmitted signal and the a priori knowledge to formulate a cost function C as the expected value $E\{|r-\hat{r}|^2\}$ of a distance between r and a reconstructed signal $\hat{r}$, wherein $\hat{r}$ is obtained as the convolution Bh of a matrix B of bits $b_k$ of the transmitted signal b with a channel vector h, each transmitted bit $b_k$ has a log-likelihood ratio $L(b_k|r)$ which is conditioned on the received signal r, and each transmitted bit $b_k$ is estimated as $\tanh\frac{1}{2}L(b_k|r)$; and choosing, for the estimated channel impulse response, a value of h for which C has a minimum value when the expected value $E\{|r-\hat{r}|^2\}$ is taken over the bits $b_k$ as conditioned on r.

2. A method as claimed in claim 1, wherein the a priori knowledge is obtained from data estimation performed on the transmitted signal.

3. A method as claimed in claim 1, wherein the a priori knowledge is obtained from a channel decoder.

4. A method as claimed in claim 1, wherein the cost function C is formulated using channel sounding.

* * * * *